Feb. 9, 1954  R. C. STEELE  2,668,327
METHOD OF MAKING A CURVED HONEYCOMB PRODUCT
Filed April 21, 1950  3 Sheets-Sheet 1

INVENTOR.
ROGER C. STEELE
BY
Townsend and Townsend
ATTORNEYS.

Feb. 9, 1954 R. C. STEELE 2,668,327
METHOD OF MAKING A CURVED HONEYCOMB PRODUCT
Filed April 21, 1950 3 Sheets-Sheet 2

INVENTOR.
ROGER C. STEELE
BY
Townsend and Townsend
ATTORNEYS.

Feb. 9, 1954   R. C. STEELE   2,668,327
METHOD OF MAKING A CURVED HONEYCOMB PRODUCT
Filed April 21, 1950   3 Sheets-Sheet 3

INVENTOR.
ROGER C. STEELE
BY
Townsend and Townsend
ATTORNEYS

Patented Feb. 9, 1954

2,668,327

UNITED STATES PATENT OFFICE 2,668,327

METHOD OF MAKING A CURVED HONEYCOMB PRODUCT

Roger C. Steele, Albany, Calif., assignor to California Reinforced Plastics Company, Oakland, Calif., a corporation of California Application April 21, 1950, Serial No. 157,251

15 Claims. (Cl. 18—47.5)

This invention relates to a new method of making a curved honeycomb product.

In recent years various methods and means have been developed to manufacture commercially a cellular structure of a kind known in the trade as honeycomb or honeycomb core structure. This type of cellular structure is indicated generally in my copending application, issued as U. S. Patent No. 2,610,934, on September 16, 1952. Somewhat generally similar constructions are also illustrated in the following patents; 1,924,472, August 29, 1933, Thomson; 1,932,359, October 24, 1933, Thomson; and 2,428,979, October 14, 1947, May. Although in the past considerable effort has been directed to developing flat sheets of honeycomb material made of cellulose material, such as paper, there has in recent years been a move on the part of various manufacturers and fabricators to make the cellular structures out of materials other than paper, such as metal foil, glass cloth or the like. The present invention relates generally to honeycomb material formed of any of these materials.

Honeycomb construction of the type alluded to above is employed as a core in laminated panel and wall structures. Moreover, honeycomb core structures also are being used presently in fabricating the fuselage and bulkheads of various type aircraft, and the construction can also be employed in the manufacture and fabrication of radomes for aircraft, missiles, aircraft fuselage, control surfaces, boat hulls, cabinet structures, and in many other types and kinds of structures.

A flat sheet of the honeycomb core material of the type above indicated, whether it be made from paper, metal foil, resin impregnated cloth or glass cloth, or other material, is characterized by a tendency to assume a saddle-back curve when an attempt is made to bend it to form it into a curved surface or body. More specifically, when a length of the honeycomb or cellular sheet material is bent in an attempt to form a simple curve therein along a first axis thereof, the stresses exerted on the honeycomb sheet due to the bending action will cause the sheet to assume a saddle-back curve along a second axis thereof normal to the first axis of the sheet.

It is common practice amongst fabricators today to treat sheets of the honeycomb material with various chemical agents to give them greater structural strength and for other purposes. Generally speaking, the more commonly used chemical agents are thermo-plastic or thermo-setting synthetic resins and of these the thermo-setting type resin is probably the more practical and the most extensively used. A number of more or less commonly used and satisfactory synthetic resins are here listed:

Melamine formaldehyde
Urea formaldehyde
Phenol furfural
Diallyl phthalate
Phenol resorcinol formaldehyde
Phenol formaldehyde A generally common characteristic of all of the above named synthetic resins is their ability to be advanced successively into different states of matter—i. e., each of the above compounds may be advanced through different states or stages, and with each succeeding stage of advancement the resin will undergo a change in its physical and chemical property characteristics. For example, phenol formaldehyde resin is produced and sold in liquid solution, and while in solution may be used conveniently as an impregnating agent. Phenol formaldehyde may be applied to a web or sheet of honeycomb material in its first or liquid state and dried to a second state by subjecting it to temperatures in the neighborhood of 230° F. for a period of about ten minutes. In the second state the resin is dry to the touch, quite pliable and is slightly less soluble, depending on the times and temperature employed in the drying operation.

Advancement of the resin from its second state to a third state may be effected by subjecting it to temperatures approximating 300° F. for a period of about ten minutes. In this state or stage the resin may be considered for all practical purposes as being fully cured or set and remains infusible even upon application of further heat. In the third state or stage phenol formaldehyde is dry, and relatively hard and unpliable.

Although I have summarized, by way of example only, the steps of curing phenol formaldehyde, it is pointed out that all of the other thermo-setting resins, above listed, react generally in the same way and can be advanced through successive stages—i. e., each of the other named synthetic resins are characterized by their ability to be advanced or cured successively from liquid or liquid solution first states to relatively dry and substantially pliable second states and thence to substantially dry, hard and relatively unpliable third states. The chemistry involved in the advancement or curing of different resins through successive states or stages does not of itself constitute a part of this invention. It will suffice to say that some resins cure through successive polymerization, whereas others cure through condensation or addition reactions.

It has already been pointed out that honeycomb type core material is employed in the manufacture and fabrication of radomes for aircraft, and synthetic resin impregnated glasscloth is the principal material used in this construction. It is common practice for a manufacturer to ship to the aircraft fabricator logs or flat sheets of resin impregnated honeycomb material which have been cured to their final or third state. As a result, the sheets of honeycomb can not be molded to any considerable extent to form curved bodies to conform with the rounded radome mold or frame because, although elongated sheets of fully cured honeycomb are sufficiently flexible to be bent to form a curve in the direction of one of their axes, they can not be bent to form rounded bodies without assuming saddle-back curves in the manner and for the reasons above pointed out. Because of this phenomenon, the fabricator of the final radome structure is compelled to take relatively small and irregular size pieces of the honeycomb material and piece and fit them all together in a "jigsaw puzzle" fashion upon a rounded mold or frame which has been constructed to conform in size and contour to the specified radome structure. It is believed evident that the present day practices, as above outlined, demand the expenditure of considerable human effort and skilled labor and result in a very substantial waste of honeycomb core material. Moreover, radomes which are fabricated in this manner are actually composed of a plurality of small substantially flat plane surfaces pieced together, rather than comprising one or several pieces which are themselves individually rounded to conform with the general contour of the radome.

Although I have explained the manner in which honeycomb material is employed in radome construction as exemplary of the difficulties attendant with the use of honeycomb material in fabricating rounded bodies, it is understood that there are innumerable other objects of construction (such as boat hulls, cabinet structures, aircraft wings, fuselage structures, and numerous others) where honeycomb core structure is of great value.

A principal object therefore, of the present invention is to teach a new method of making a curved, saddleback free, honeycomb product from a flat sheet of honeycomb.

Further objects of the present invention will become apparent upon reading the following specification and referring to the accompanying drawings in which similar characters of reference represent corresponding parts in each of the several views.

In the drawings:

Fig. 1 is a perspective view of an elongated flat sheet of honeycomb-type material of substantially uniform thickness and cell size.

Figs. 2 through 5, inclusive, illustrate the inherent tendency of a sheet of the material to form a saddle-back curve along a first axis thereof when the sheet is bent to form a curve along a second axis thereof normal to said first axis.

Fig. 6 is a perspective view illustrating a sheet of honeycomb material in association with a mold for forming a compensating simple curve along the lengthwise axis of the sheet.

Figs. 7 through 10, inclusive, illustrate how the simple curve formed initially along the lengthwise axis of a sheet of honeycomb compensates for the saddle-back curve which has a tendency to form along this axis upon the bending of the sheet to form a curve along its transverse axis.

Figure 2:
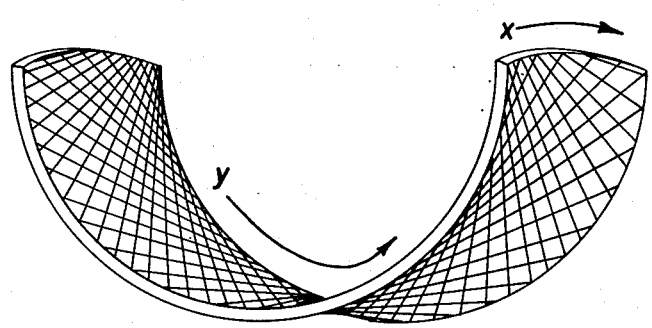
Figure 3:
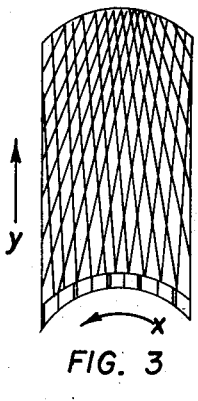
Figure 4:
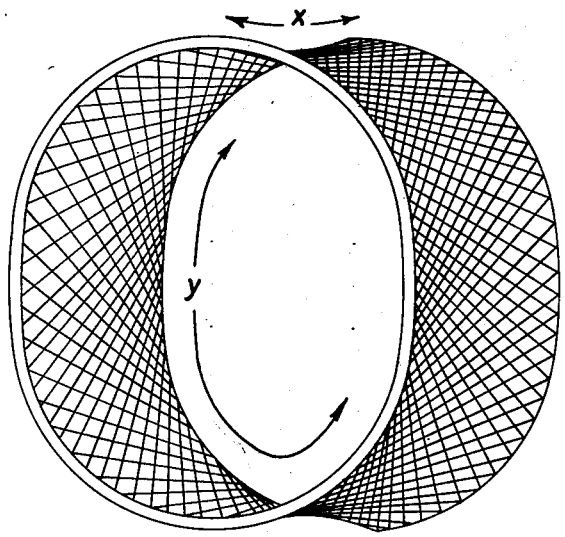
Figure 5:
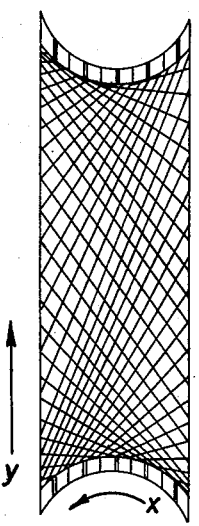
Figure 1:
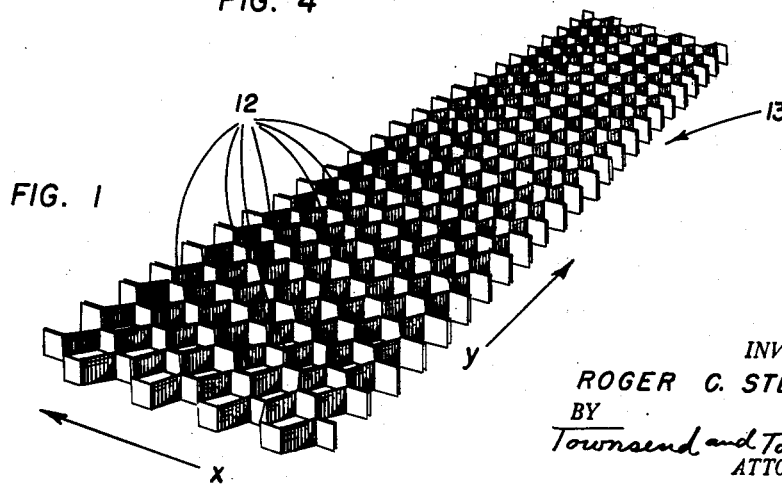
Figure 7:
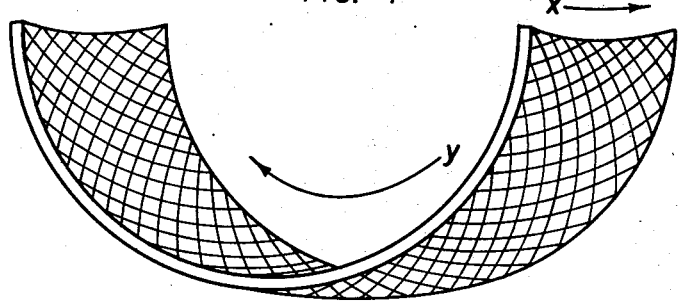
Figure 8:
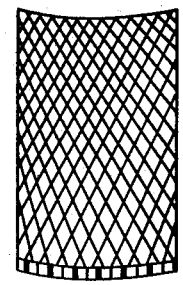

Referring to the drawings it is pointed out initially that only in Figs. 1, 6, 11 and 12 are the individual cells of the material illustrated as being substantially hexagonal in shape. In the other figures cellular construction is indicated schematically by criss-cross lines.

Figs. 1 through 5, inclusive, illustrate the point made hereinabove that when a sheet of honeycomb material is bent to form a simple curve in the direction of axis $y$ for example, a saddle-back curve will tend to form in the direction of axis $x$ thereof normal to axis $y$. Similarly, it has been found that when an attempt is made to bend the material to form a simple curve in the direction of axis $x$ a saddle-back curve will tend to form in the direction of axis $y$.

The glue lines which bond the cell forming material together are indicated at 12. It is noted that the elongated axis of the glue lines are disposed substantially parallel with one another and extend in the direction of designated axis $x$ of the sheet. Because the glue lines of honeycomb material all extend in a common direction, the sheet of honeycomb is far more rigid along this axis than along the axis of the sheet which is disposed normal to the direction in which the glue lines extend. Thus, it is a fact that when an attempt is made to bend the sheet appropriately to form a simple curve in the direction of axis $y$ the saddle-back curve which will tend to form in the direction of axis $x$ will not be as pronounced as would be the reverse situation where the saddle-back curve forms in the direction of axis $y$ due to the bending stresses exerted when an attempt is made initially to bend the sheet to form a simple curve in the direction of axis $x$.

To overcome the above described difficulties attendant with the bending of a sheet of honeycomb material to form a curved body, I first form a simple curve having a predetermined radius of curvature along a first axis thereof to compensate for the saddle-back curve which tends to form along this same axis when the material is bent to form a simple curve along a second axis of the material normal to the first axis thereof. In view of the fact that most of the materials, such as impregnated glass-cloth, paper, or the like, out of which the honeycomb is made are quite resilient, a chemical agent, and more particularly a suitable binder, must be employed to secure or fix the simple compensating curve along the first axis of the material once it has been formed therealong by pressure molding or the like.

Assuming, that one of the hereinabove enumerated thermo-setting synthetic resins is to be employed as a binder and taking as a specific example phenol formaldehyde, the following steps would be performed to chemically bind or cure and thereby fix a compensating simple curve in a sheet of honeycomb material. First, a sheet of honeycomb, such as indicated generally at 18 in Figs. 1 and 6, while in its flat form, is impregnated with a liquid solution of phenol formaldehyde and advanced to its second state by subjecting the resin-impregnated sheet to temperatures ranging in the neighborhood of 230° for a period of about ten minutes. A sheet of resin-impregnated honeycomb in the second state is relatively pliable and elastic, and, as indicated previously, the resin itself is dry to the touch.

Figure 6:
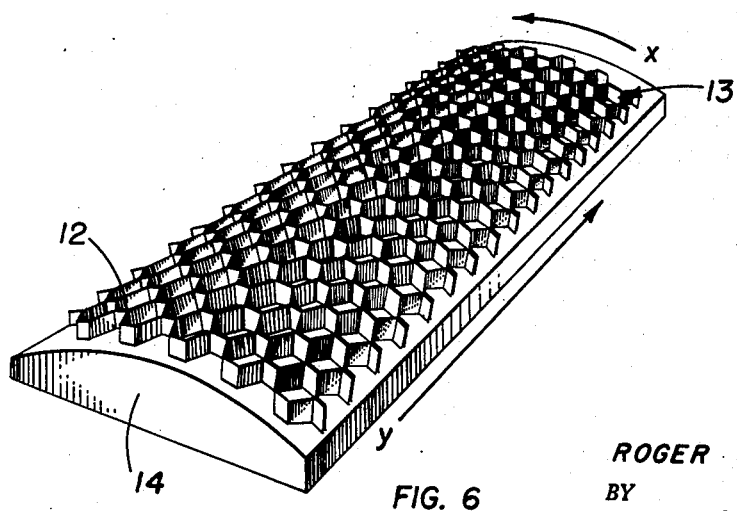
Figure 11:
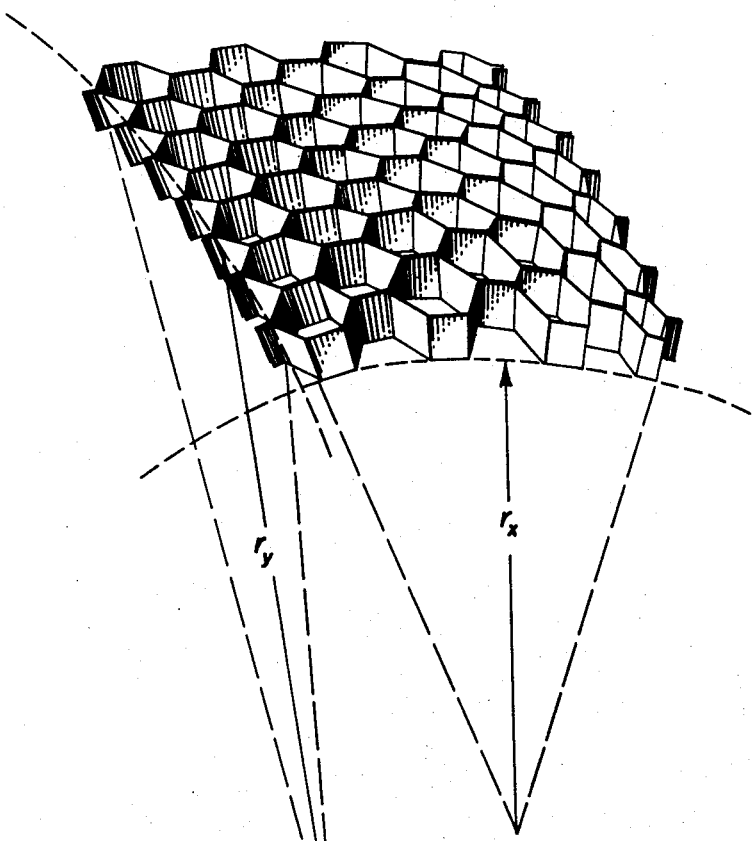
Fig. 11 is a view of a sheet of curve cured honeycomb material showing its radii of curvatures in designated $x$ and $y$ directions.

After resin-impregnated sheet 13 has been advanced to its second state in the manner described, it is preferably heated to a degree sufficient to cause the plastic to soften, and simultaneously, the sheet is subjected to bending stresses appropriate to form a simple curve along one of its axes. Fig. 6, for example, illustrates how the sheet may be positioned on a mold or die block 14 having its top or molding surface formed with the desired curvature which is to be imparted to the sheet. A second die block or mold (not shown), complementary to die block 14 may be employed to apply downward pressure to the top of the sheet 13 to press it firmly against the top of curved mold 14 to make the sheet conform precisely to the contour of the mold curvature. Fig. 6 indicates the sheet 13 of honeycomb material as having been placed on mold 14 with the glue lines 12 thereof extending in the direction of axis $x$ which, of course, corresponds to the direction of the radius of curvature of the mold. As heretofore indicated, the honeycomb material, whether it be made from paper, glasscloth, or the like, is quite elastic, and when a flat sheet of the material is temporarily deformed through application of bending pressure, the sheet, upon release of the pressure, will tend to assume its original flat shape. Thus, it becomes evident that during the time the sheet is subjected to the pressure of the molds or die blocks, it is necessary to actually chemically cure or fix the curve in the sheet formed by the bending pressure.

With the above in mind the resin-impregnated honeycomb sheet, while being subjected to the bending action of the molds is subjected (preferably in the presence of a suitable catalyst) to temperatures ranging in the vicinity of 300° F. for a period of about ten minutes to cure the resin-impregnate to its third state. The application of heat initially and temporarily softens the resin and facilitates the bending of the material very considerably. At this point the simple curve formed in the material through the action of the molds will actually be cured or fixed in the sheet 13 and the resultant product is a sheet of honeycomb of substantially uniform thickness and cell size which has been formed with a simple curve along one of its axes. As previously noted, however, an elongated sheet of resin-impregnated honeycomb material which has been cured to its third state is still sufficiently flexible to permit it to be bent to form a curve along an axis normal to the axis of the compensating curve. In the instant case, sheet 13 after it has been cured to its third state with the compensating curve extending in the direction of axis $x$, can be readily bent to form a curve in the direction of axis $y$.

Figs. 7 through 10, inclusive, illustrate how the simple curve formed in the direction of axis $x$ of the sheet 13 compensates for the saddle-back curve which tends to form in the direction of this axis when the ends of the sheet are bent towards one another to form a curve in the direction of axis $y$ of the sheet. These figures also illustrate how the compensating simple curve flattens as the ends of the sheet are bent further toward one another.

Figure 9:
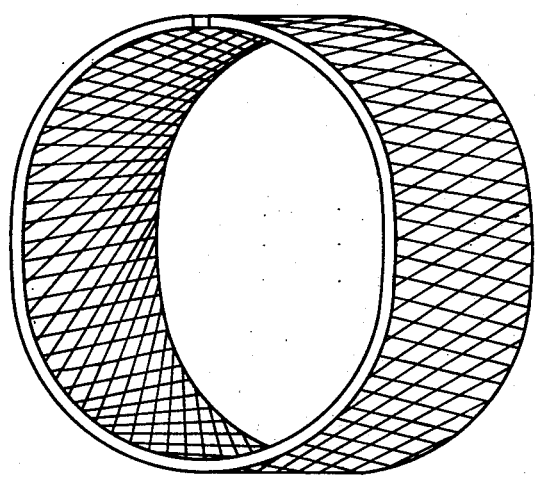
Figure 10:
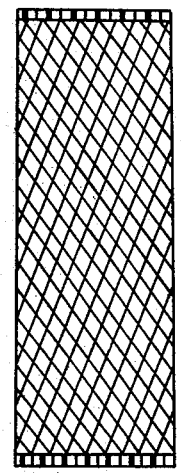

Figs. 9 and 10 illustrate that there is a point whereat the radius of curvature of the compensating curve approaches infinity; any further bending of the ends of the sheet towards one another will cause a saddle-back curve to form in the material.

As I have previously explained, a principal object of this invention is to provide a way whereby relatively large pieces of preformed sheets of honeycomb may be incorporated into a rounded structure, such as an aircraft radome. Most radome structures are generally hemispherical in shape, and, therefore, their surfaces comprise compound curvatures. If it is imagined that a hemispherical body, such as a radome structure, comprises or is made up of a plurality of relatively large pieces fitted together to form the rounded radome, it is believed readily understandable that the surface of each individual piece would exist as a compound curvature. This being true then each separate piece or section of the material may be considered for all practical purposes as having a radius of curvature extending in the direction of an $x$ axis and a radius of curvature extending in the direction of a $y$ axis. Moreover, the radius of curvature along the $x$ axis of each piece is readily mathematically determinable, and similarly, the radius of curvature taken along the $y$ axis of each piece is equally as determinable. (In the case of a true hemisphere the radius of curvature taken along one axis thereof would be the same as the radius of curvature taken along any other axis.)

To fabricate a radome of specified dimensions from relatively large pieces of honeycomb material properly fitted together in accordance with the present invention, it is first determined in advance where each section or piece of honeycomb is to fit with respect to the other pieces, and, of course, the radii of curvatures along the $x$ and $y$ axes of each piece may be determined readily. As previously explained, a compensating curve cured in a sheet of honeycomb material in the manner described hereinabove, will tend to flatten out more and more proportionately to the amount that the sheet is bent to form a curve along an axis normal to the compensating curve. Stated in another way the radius of curvature of the simple compensating curve (in the $x$ direction) increases proportionately to the amount that the radius of curvature of the curve (in the $y$ direction) formed by the bending of the material decreases. This relationship between the radius of the compensating curve and the radius of the curve formed upon bending of the material becomes very important when it is considered that each individual piece of honeycomb, after it has been fitted into its proper place within the radome structure, must assume a curved form of specified dimensions and contour to conform with the general overall rounded contour and shape of the finished radome structure.

To elaborate, if the radius of the compensating curve is too short the bending of the material into place in its designated position within the rounded radome body will not exert sufficient stress to flatten the compensating curve sufficiently to make it conform properly to the curved contour of the finished radome structure. The compensating curve of the piece would in this latter instance constitute a convex bulge in the radome surface. Similarly, if the radius of curvature of the compensating curve of a piece of honeycomb is initially made too long whereby the curve is formed too flat the stresses imparted due to the bending of the material into its position within the radome structure would cause a saddle-back curve to form in the material. Thus, in this case, a concave groove would be formed in the outer surface of the radome shell.

Mathematical equations can be formulated by which the proper radius of the compensating curve to be formed in a given sheet of material can be computed when the radii in the $x$ and $y$ directions of the finely formed rounded product are given.

Figure 12:
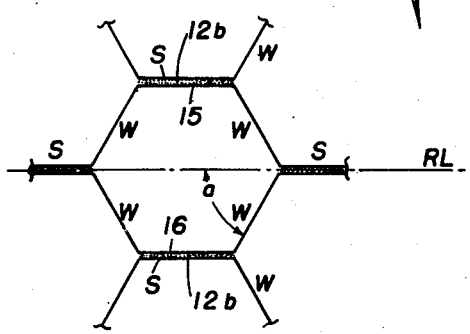
Fig. 12 is an enlarged view of a single cell of a preferred type of honeycomb construction.

Obviously, the cellular construction of all types of honeycomb material are not the same. I have found, however, that the cellular construction indicated in detail in Fig. 12 comprises an extremely satisfactory core structure, not only because it is particularly adapted for production in large quantities, but because of its inherent excellent structural characteristics as a product of manufacture. More specifically, Fig. 12 illustrates a single cell of material in which a certain desired and known relationship exists between the length of the end walls and the length of the bonding lines and in the angular relationships between the lengthwise axes of both these latter elements at their points of intersection. To elaborate, a cell of the type illustrated in Fig. 12 may be considered as comprising four end-forming walls W, and two side-forming walls S. It is noted that the side walls S are bonded by adhesive to the corresponding side walls of adjacent cells, and thus, the length of the side walls S also represent the length of the bonding lines. The four end-forming walls W are, of course, not connected by adhesive to adjacent cell walls.

The economics involved in production of honeycomb material by the apparatus disclosed in my copending application above identified for example dictates that the angle between pairs of end walls W approximate about 90°, thereby making the angles between the end walls and the side walls at their points of juncture approximately 135°. Thus, the cell indicated in Fig. 12 does not represent a regular or equiangular hexagon.

The two side walls or bonding lines S are of equal length, and similarly, all four end walls W are of the same length. Moreover, it is to be noted that each of the side walls or bonding lines S is represented in Fig. 12 as having a length approximately only seven-tenths (.7) the length of any end wall W. The reason for the difference in respective lengths between walls W and S is again primarily one of manufacturing expedience i. e., adequate bonding strength between the cells can be established by utilizing relatively narrower or shorter glue lines which, in turn results in a saving in the amount of adhesive which need be employed, and in greater flexibility of the sheets of honeycomb.

Therefore, with reference to Fig. 12 and assuming the following:

$S$ = the length of the bonding lines.
$W$ = the length of the end walls.
$RL$ = a reference line drawn medially and lengthwise of a cell.
$a$ = the angle between RL and W (as above noted the angle formed by the intersection of two end walls is approximately 90°. Therefore, angle $a$ may be considered as being one-half of 90° or 45°).
$R$ = the radius of curvature of the molding surface over which the honeycomb structure is to be cured to impart the compensating curve therein.
$x$ = the axis of a sheet of honeycomb in the direction of its bonding lines.
$y$ = the axis of a sheet of honeycomb in the direction normal to the $x$ axis.
$R_x$ = the radius of simple curvature of the compensating curve fixed in a sheet of honeycomb when the radius of curvature thereof extends in the $x$ direction.
$R_y$ = the radius of simple curvature of the compensating curve fixed in a sheet of honeycomb when the radius of curvature thereof extends in the $y$ direction.
$r_x$ = the radius of curvature in the $x$ direction of a sheet of honeycomb formed into an end-product having fixed determinable radii of curvatures in the $x$ and $y$ directions.
$r_y$ = the radius of curvature in the $y$ direction of a sheet of honeycomb formed into an end-product having fixed determinable radii of curvatures in the $x$ and $y$ directions.

Now assuming angle $a$ to be about 45° the following general equations may be derived:

$$R_x = \frac{S+(W)\sin a}{\frac{s+(W)\sin a}{r_x}+\frac{W \cos a}{r_y}}$$

$$R_y = \frac{W \cos a}{\frac{S+(W)\sin a}{r_x}+\frac{W \cos a}{r_y}}$$

When S is seven-tenths (.7) the length of W and since sin 45 = cos 45 = .7, the above equations may be simplified and restated as follows:

$$R_x = \frac{2}{\frac{2}{r_x}+\frac{1}{r_y}}$$

$$R_y = \frac{1}{\frac{2}{r_x}+\frac{1}{r_y}}$$

Although the above equations are formulated on the proposition that angle $a$ is 45°, a variance of as much as 5° either way will not affect the accuracy of the results obtained through use of the equations for all practical purposes.

It is possible through employment of the above equations for a manufacturer after he has determined as aforesaid the $r_x$ and $r_y$ factors to compute the $R_x$ or $R_y$ factors. It is believed evident that the computed $R_x$ or $R_y$ factors determine in the particular instance the proper R factor—i. e., the radius of simple curvature of the molding surface should equal the computed $R_x$ or $R_y$ factors.

Although I prefer to employ any one of the thermosetting synthetic resins hereinabove named as a curing or binding agent, it is believed readily understandable that other suitable chemical binders, such as various types of thermoplastic synthetic resins as well as various types of organic compounds, such as latex or rubber, can be effectively utilized to cure or fix a compensating curve in a sheet of honeycomb material. Such binders must, of course, possess sufficient binding qualities to fix a curve formed in a sheet of honeycomb and prevent any inherent resilient qualities of the material from springing the curve out of its predetermined shape and form. It is also believed evident from the foregoing that the binder employed must have sufficient plastic qualities to permit the cured sheet to be flexed or bent in a direction appropriate to form a curve along the axis of the sheet normal to the axis of the simple compensating curve. It is worthy of mention, however, that the thermosetting synthetic resins of the type specifically referred hereinabove are particularly adaptable in manufacturing honey-comb products for structural uses because of the fact that synthetic resin-impregnated and cured honeycomb materials are extremely light in weight, have great structural strength and result in a product which is extremely low in moisture absorption and electrical conductivity. In aircraft construction the above mentioned advantages attendant with the utilization of synthetic resin-impregnates is extremely important.

Although I have explained the practice of the present invention without particular reference to any specific manner of making the cellular honeycomb structure per se, I prefer to manufacture the sheets of honeycomb according to the teachings disclosed in U. S. Patent No. 2,610,934 dated September 16, 1952. In this latter application it is explained how honeycomb may be manufactured by applying to opposite sides of a flat sheet of flexible material, such as paper, alternately spaced parallel glue lines, and then by lapping the sheet back and forth over itself a number of times, build up a stack of superposed layers having alternately spaced glue lines. The stack of glued sheets may then be cut in a direction transverse to the direction of the glue lines to form slices of unexpanded honeycomb.

In the event that the honeycomb is made in this manner it is preferable to impregnate the original sheet of flexible material out of which the honeycomb is to be made with the chosen liquid synthetic resin and to advance it to its dry but pliable second state prior to applying to it the glue lines and prior to lapping the sheet back and forth over itself to form a stack of glued sheets. Thereafter slices of the unexpanded honeycomb may be expanded over the curved molding surface and held in expanded position by pressure of the die blocks and the impregnate advanced to its third state in the manner previously described. The advancing of the impregnated sheet to its third state will, in one operation, both serve to fix the compensating simple curve in the material and fix the sheet in its permanent expanded form.

Thus, it is understood that the practice of this invention is not confined to any particular time that the honeycomb must be impregnated with the liquid resin and cured to its second state. This step may be performed before or after the sheet of honeycomb itself is fully formed or manufactured.

Although I have described my invention in some detail by way of illustration and example for purposes of clarity of understanding, it is understood that certain changes and modifications may be made within the spirit of the invention and scope of the appended claims.

I claim:

1. In a method of treating a flexible flat sheet of cellular material of substantially uniform cell size which is characterized by its tendency to form a saddle-back curve along a first major axis of the sheet when said sheet is bent to form a curve along a second major axis normal to said first axis, the steps comprising; forming a simple curve in a sheet of the material along the first axis thereof compensatory with respect to the saddle back curve which will tend to form in the sheet along its first axis when said sheet is subjected to stresses attendant with the bending of the said sheet to form a curve along a second axis thereof normal to said first axis, and treating said sheet with a chemical binder to fix said compensating simple curve formed in the sheet, said chemical binder being selected from a class possessing sufficient binding qualities to prevent any inherent resilient tendencies of the material from which the sheet is made from springing the curve out of its predetermined shape yet having sufficient plastic qualities to permit said sheet to be flexed in a direction appropriate to form a curve along the second axis thereof, and then bending said flexible sheet appropriate to form a curve along the second major axis of said sheet normal to said first axis to thereby form a saddle-back-free rounded honeycomb product.

2. A method of manufacturing an end-product comprising an elongated sheet of cellular honeycomb type material of substantially uniform cell size which has been bent to form a curved body free of any saddle-back curve caused by the bending thereof, from a flat sheet of flexible cellular honeycomb type material of substantially uniform thickness and cell size and which said sheet is further characterized by its tendency to form a saddle-back curve along a first major axis thereof when said sheet is bent to form a simple curve along a second major axis thereof normal to said first axis, comprising the steps; impregnating said flat sheet, with a liquid thermosetting synthetic resin of a type characterized by its ability to be advanced successively from a liquid first state to a relatively dry and substantially pliable second state and thence to a substantially dry, hard and relatively unpliable third state, advancing the resin impregnate of said flat sheet to its second state, then subjecting said resin impregnated flat sheet to bending stresses appropriate to form a simple curve of predetermined radius of curvature along said first axis of said sheet compensatory with respect to the saddle-back curve which will tend to form in the sheet along its first axis when said sheet is bent in the direction of its second axis, and while maintaining the bending stresses on said sheet further advancing said resin impregnate to its third state, whereby when said bending stresses are released from said sheet the simple curve will be fixed therein, and then bending said flexible sheet in the direction of its second axis to form said curved saddle-back-free end-product.

3. A method of treating a flat flexible sheet of cellular honeycomb material of substantially uniform cell size and further characterized as follows: (1) said sheet having all of its bonding lines extending in a common direction; (2) each individual cell of said sheet being substantially hexagonal in shape and defining two pairs of end walls, and (3) each cell proportioned whereby a line drawn medially and lengthwise thereof defines an angle of approximately 45° between said line and each end wall which said line intersects, in order to fabricate an end product comprising a said sheet of honeycomb material which has been formed into a rounded body having fixed determinable radii of curvatures extending respectively in the direction of the bonding lines and in a direction normal to said bonding lines, said method comprising the steps of: fixing a simple saddleback compensating curve in a sheet of said honeycomb material of the type herein characterized whereby the radius of curvature of said simple curve extends in the direction of the bonding lines of said sheet, the radius of curvature of said simple curve being determined and fixed with reference to the said fixed determinable radii of curvatures of said end-product to be fabricated in accordance with the relation $$R_x = \frac{S+(W)\sin a}{\frac{s+(W)\sin a}{r_x}+\frac{W\cos a}{r_y}}$$

wherein $R_x$ equals the radius of curvature of said simple compensating curve; S equals the average length of the bonded side walls of the cells; W equals the average length of the end walls of the cells; $a$ equals the angle defined by the intersection of an adjacent end wall and a line drawn medially and lengthwise of a cell; $r_x$ equals the fixed determinable radius of curvature extending in the direction of the cell bonding lines of the said end-product, and $r_y$ equals the fixed determinable radius of curvature extending in a direction normal to the bonding lines of the said end-product, and then bending said flexible sheet to form a curve in said sheet having a radius of curvature extending normal to the direction of said bonding lines and in accordance with said fixed determinable radii of curvatures of said end product.

4. A method according to claim 3 and wherein said simple saddle-back compensating curve is fixed in said sheet of cellular honeycomb material by impregnating said sheet with a chemical binder prior to forming a curve therein, then forming said simple saddle-back compensating curve in said sheet in accordance with said given relation, and simultaneously with the forming of said simple compensating curve in said sheet advancing said chemical binder impregnate to a degree sufficient to fix said curve in said sheet and prevent any inherent resilient tendencies of the material from which said sheet is made from springing said curve out of its predetermined form.

5. A method according to claim 3 and wherein said simple saddle-back compensating curve is fixed in said sheet of cellular honeycomb material by impregnating said sheet prior to forming a curve therein with a chemical binder in liquid form comprising a thermosetting synthetic resin of a type characterized by its ability to be advanced successively from a liquid first state, through a dry, relatively pliable second state, to a dry, relatively hard unpliable third state, advancing said resin impregnate to its second state, and then forming said simple saddleback compensating surve in said sheet in accordance with said given relation and simultaneously with the forming of said curve advancing said resin impregnate to its third state.

6. A method of treating a flat flexible sheet of cellular honeycomb material of substantially uniform cell size and further characterized as follows: (1) said sheet having all of its bonding lines extending in a common direction; (2) each individual cell of said sheet being hexagonal in shape and defining two pairs of end walls and a pair of opposed side walls, and (3) each cell proportioned whereby a line drawn medially and lengthwise thereof defines an angle of approximately 45° between said line and each end wall which said line intersects, in order to fabricate an end-product comprising a said sheet of honeycomb material which has been formed into a rounded body having fixed determinable radii of curvatures extending respectively in the direction of the bonding lines and in a direction normal to said bonding lines, said method comprising the steps of: fixing a simple saddle-back compensating curve in a sheet of said honeycomb material of the type herein characterized whereby the radius of curvature of said simple curve extends in the direction of the bonding lines of said sheet, the radius of curvature of said simple curve being determined and fixed with reference to the said fixed determinable radii of curvatures of said end-product to be fabricated in accordance with the relation $$R_y = \frac{W\cos a}{\frac{S+(W)\sin a}{r_x}+\frac{W\cos a}{r_y}}$$

wherein $R_y$ equals the radius of curvature of said simple compensating curve; S equals the average length of the bonded side walls of the cells; W equals the average length of the end walls of the cells; $a$ equals the angle defined by the intersection of an adjacent end wall and a line drawn medially and lengthwise of a cell; $r_x$ equals the fixed determinable radius of curvature extending in the direction of the cell bonding lines of the said end-product, and $r_y$ equals the fixed determinable radius of curvature extending in a direction normal to the bonding lines of the said end-product, and then bending said flexible sheet to form a curve in said sheet having a radius of curvature extending normal to the direction of said bonding lines and in accordance with said fixed determinable radii of curvatures of said end product.

7. A method according to claim 6 and wherein said simple saddle-back compensating curve is fixed in said sheet of cellular honeycomb material by impregnating said sheet with a chemical binder prior to forming a curve therein, then forming said simple saddleback compensating curve in said sheet in accordance with said given relation, and simultaneously with the forming of said simple compensating curve in said sheet advancing said chemical binder impregnate to a degree sufficient to fix said curve in said sheet and prevent any inherent resilient tendencies of the material from which said sheet is made from springing said curve out of its predetermined form.

8. A method according to claim 6 and wherein said simple saddle-back compensating curve is fixed in said sheet of cellular honeycomb material by impregnating said sheet prior to forming a curve therein with a chemical binder in liquid form comprising a thermosetting synthetic resin of a type characterized by its ability to be advanced successively from a liquid first state, through a dry, relatively pliable second state, to a dry, relatively hard and unpliable third state, advancing said resin impregnate to its second state, and then forming said simple saddle-back compensating curve in said sheet in accordance with said given relation and simultaneously with the forming of said curve advancing said resin impregnate to its third state.

9. A method of treating a flat flexible sheet of cellular honeycomb material of substantially uniform cell size and further characterized as follows: (1) said sheet having all of its bonding lines extending in a common direction; (2) each individual cell of said sheet being substantially hexagonal in shape and defining two pairs of end walls and a pair of opposed side walls; (3) each cell proportioned whereby a line drawn medially and lengthwise thereof defines an angle of approximately 45° between said line and each end wall which said line intersects; and (4) each side wall of each cell having a length approximately seven-tenths the length of an end wall thereof, in order to fabricate an end-product comprising a said sheet of honeycomb material which has been formed into a rounded body having fixed determinable radii of curvatures extending respectively in the direction of the bonding lines and in a direction normal to said bonding lines, said method comprising the steps of: fixing a simple saddle-back compensating curve in a sheet of said honeycomb material of the type herein characterized whereby the radius of curvature of said simple curve extends in the direction of the bonding lines of said sheet, the radius of curvature of said simple curve being determined and fixed with reference to the said fixed determinable radii of curvatures of said end-product to be fabricated in accordance with the relation $$R_x = \frac{2}{\frac{2}{r_x} + \frac{1}{r_y}}$$

wherein $R_x$ equals the radius of curvature of said simple compensating curve; $r_x$ equals the fixed determinable radius of curvature extending in the direction of the cell bonding lines of the said end-product, and $r_y$ equals the fixed determinable radius of curvature extending in a direction normal to the bonding lines of the said end-product, and then bending said flexible sheet to form a curve in said sheet having a radius of curvature extending normal to the direction of said bonding lines and in accordance with said fixed determinable radii of curvatures of said end product.

10. A method according to claim 9 and wherein said simple saddle-back compensating curve is fixed in said sheet of cellular honeycomb material by impregnating said sheet with a chemical binder prior to forming a curve therein, then forming said simple saddle-back compensating curve in said sheet in accordance with said given relation, and simultaneously with the forming of said simple compensating curve in said sheet advancing said chemical binder impregnate to a degree sufficient to fix said curve in said sheet and prevent any inherent resilient tendencies of the material from which said sheet is made from springing said curve out of its predetermined form.

11. A method according to claim 9 and wherein said simple saddle-back compensating curve is fixed in said sheet of cellular honeycomb material by impregnating said sheet prior to forming a curve therein with a chemical binder in liquid form comprising a thermosetting synthetic resin of a type characterized by its ability to be advanced successively from a liquid first state, through a dry, relatively pliable second state, to a dry, relatively hard unpliable third state, advancing said resin impregnate to its second state, and then forming said simple saddle-back compensating curve in said sheet in accordance with said given relation and simultaneously with the forming of said curve advancing said resin impregnate to its third state.

12. A method of treating a flat flexible sheet of cellular honeycomb material of substantially uniform cell size and further characterized as follows: (1) said sheet having all of its bonding lines extending in a common direction; (2) each individual cell of said sheet being hexagonal in shape and defining two pairs of end walls and a pair of opposed side walls; (3) each cell proportioned whereby a line drawn medially and lengthwise thereof defines an angle of approximately 45° between said line and each end wall which said line intersects, and (4) each side wall of each cell having a length approximately seven-tenths the length of an end wall thereof, in order to fabricate an end-product comprising a said sheet of honeycomb material which has been formed into a rounded body having fixed determinable radii of curvatures extending respectively in the direction of the bonding lines and in a direction normal to said bonding lines, said method comprising the steps of: fixing a simple saddle-back compensating curve in a sheet of said honeycomb material of the type herein characterized whereby the radius of curvature of said simple curve extends in the direction of the bonding lines of said sheet, the radius of curvature of said simple curve being determined and fixed with reference to the said fixed determinable radii of curvatures of said end-product to be fabricated in accordance with the relation $$R_y = \frac{1}{\frac{2}{r_x} + \frac{1}{r_y}}$$

wherein $R_y$ equals the radius of curvature of said simple compensating curve; $r_x$ equals the fixed determinable radius of curvature extending in the direction of the cell bonding lines of the said end-product, and $r_y$ equals the fixed determinable radius of curvature extending in a direction normal to the bonding lines of the said end-product, and then bending said flexible sheet to form a curve in said sheet having a radius of curvature extending normal to the direction of said bonding lines and in accordance with said fixed determinable radii of curvatures of said end product.

13. A method according to claim 12 and wherein said simple saddle-back compensating curve is fixed in said sheet of cellular honeycomb material by impregnating said sheet with a chemical binder prior to forming a curve therein, then forming said simple saddle-back compensating curve in said sheet in accordance with said given relation, and simultaneously with the forming of said simple compensating curve in said sheet advancing said chemical binder impregnate to a degree sufficient to fix said curve in said sheet and prevent any inherent resilient tendencies of the material from which said sheet is made from springing said curve out of its predetermined form.

14. A method according to claim 12 and wherein said simple saddle-back compensating curve is fixed in said sheet of cellular honeycomb material by impregnating said sheet prior to forming a curve therein with a chemical binder in liquid form comprising a thermosetting synthetic resin of a type characterized by it ability to be advanced successively from a liquid first state, through a dry, relatively pliable second state, to a dry, relatively hard and unpliable third state, advancing said resin impregnate to its second state, and then forming said simple saddle-back compensating curve in said sheet in accordance with said given relation and simultaneously with the forming of said curve advancing said resin impregnate to its third state.

15. In a method of manufacturing an end-product comprising an elongated sheet of cellular honeycomb type material of substantially uniform cell size which has been bent to form a curved body free of any saddle-back curve caused by the bending thereof from a flat sheet of flexible cellular honeycomb type material of substantially uniform thickness and cell size and which said sheet is further characterized by its tendency to form a saddle-back curve along a first major axis thereof when said sheet is bent to form a simple curve along a second major axis thereof normal to said first axis comprising the steps; fixing a simple curve in a said relatively flat and flexible sheet of the honeycomb material compensatory with respect to the saddle-back curve which will tend to form along its first major axis when said sheet is bent in a direction of its second major axis, and then bending said flexible sheet in the direction of its second major axis to form the curved saddle-back-free end-product.

ROGER C. STEELE.

References Cited in the file of this patent

UNITED STATES PATENTS

| Number | Name | Date |
|---|---|---|
| 939,966 | Baekeland | Nov. 16, 1909 |
| 1,924,472 | Thomson | Aug. 29, 1933 |
| 2,142,894 | Grigg | Jan. 3, 1939 |
| 2,419,532 | Brown | Apr. 29, 1947 |
| 2,422,998 | Adams et al. | June 24, 1947 |

OTHER REFERENCES

Production of Honeycomb Cores, by J. D. Lincoln, published May 1946 in Modern Plastics, pp. 127–129.

Honeycomb Sandwich Construction, by G. May, published October 1949 in Plastics (London), pp. 64–66.

Low-Pressure Laminating of Plastics, by J. S. Hicks, published by Rheinhold Publishing Corp., N. Y., 1947, pp. 90 and 91.